United States Patent
Wang et al.

(10) Patent No.: US 10,807,498 B2
(45) Date of Patent: Oct. 20, 2020

(54) CONTROL METHOD FOR SERIES HYBRID POWER SYSTEM OR SYNERGIC ELECTRIC POWER SUPPLY AND CONTROL DEVICE THEREOF

(71) Applicant: INSTITUTE OF ELECTRICAL ENGINEERING, CHINESE ACADEMY OF SCIENCES, Beijing (CN)

(72) Inventors: Youlong Wang, Beijing (CN); Hongyang Li, Beijing (CN); Meng Peng, Beijing (CN); Jialin Wei, Beijing (CN); Xuhui Wen, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 129 days.

(21) Appl. No.: 16/286,634

(22) Filed: Feb. 27, 2019

(65) Prior Publication Data

US 2020/0130531 A1    Apr. 30, 2020

(30) Foreign Application Priority Data

Oct. 29, 2018    (CN) .......................... 2018 1 1270106

(51) Int. Cl.
*B60L 58/14*    (2019.01)
*H02M 7/04*    (2006.01)
(Continued)

(52) U.S. Cl.
CPC ............... *B60L 58/14* (2019.02); *B60L 50/61* (2019.02); *B60L 58/15* (2019.02); *H02M 7/04* (2013.01)

(58) Field of Classification Search
CPC .......... B60L 58/14; B60L 50/61; B60L 58/15; H02M 7/04
(Continued)

(56) References Cited

U.S. PATENT DOCUMENTS

| 8,063,609 | B2* | 11/2011 | Salasoo | ................... B60L 50/61 320/134 |
| 2010/0096926 | A1* | 4/2010 | King | ....................... B60L 50/61 307/45 |

(Continued)

*Primary Examiner* — Eric Blount
(74) *Attorney, Agent, or Firm* — Bayramoglu Law Offices LLC

(57) ABSTRACT

A control method for a series hybrid power system or synergic electric power supply and a control device thereof are disclosed. The control device includes: a generator reference current value generating module and a generator current control module. The generator reference current value generating module is configured to generate a reference current value of a generator according to an actual current value of an energy storage device, a reference current value of the energy storage device, an actual voltage value of a DC bus, and a reference voltage value of the DC bus. The generator current control module is configured to generate a control signal of a rectifier according to the reference current value of the generator, the actual value of any two-phase current of the generator, and an actual angular velocity of the generator, thereby controlling the series hybrid power system or the synergic electric power supply.

20 Claims, 7 Drawing Sheets

(51) Int. Cl.
*B60L 58/15* (2019.01)
*B60L 50/61* (2019.01)

(58) Field of Classification Search
USPC .................................................... 340/636.1
See application file for complete search history.

(56) References Cited

U.S. PATENT DOCUMENTS

| | | | | |
|---|---|---|---|---|
| 2012/0112702 | A1* | 5/2012 | Steigerwald | H02J 7/0072 320/137 |
| 2014/0265555 | A1* | 9/2014 | Hall | B60L 3/0046 307/9.1 |

* cited by examiner

CONTROL METHOD FOR SERIES HYBRID POWER SYSTEM OR SYNERGIC ELECTRIC POWER SUPPLY AND CONTROL DEVICE THEREOF

CROSS REFERENCE TO THE RELATED APPLICATIONS

This application is based upon and claims priority to Chinese Patent Application No. 201811270106.8, filed on Oct. 29, 2018, the entire contents of which are incorporated herein by reference.

TECHNICAL FIELD

The present invention relates to the field of series hybrid power system, and particularly to a control method for a series hybrid power system or synergic electric power supply and a control device.

BACKGROUND

Energy conservation and environmental protection are two outstanding problems of current social development. Transportation electrification is the development trend of the automobile, aviation and shipbuilding industries. However, the charging speed and energy density of batteries limit the popularity of transportation electrification technology. The oil-electric series hybrid power system can reduce fuel consumption and pollution, improve the endurance mileage of the vehicle, has higher energy density and power density than a system powered separately by a battery, and has a better dynamic characteristic than a system powered separately by a generator set. Therefore, the oil-electric series hybrid power system has been widely used in energy power systems of new energy automobiles, ships and more electric aircraft. In addition, the hybrid power system composed of gas turbine power generation system and power battery is also a backup power supply device commonly used in renewable energy distributed generation.

The general structure of a series hybrid power system is shown in FIG. 1. The prime mover 1 runs coaxially with the permanent magnet generator 2 to drive the permanent magnet generator 2 to generate electricity. The electrical terminal of the permanent magnet generator 2 is connected to a controlled rectifier 3, and the rectifier 3 rectifies alternating current generated by the generator 2 into direct current (DC). The DC side of the rectifier 3 is connected in parallel with filter capacitor 4, and energy storage device 7 (such as power battery, super capacitor, flywheel, etc.) is connected to a DC bus via DC-DC converter 8, and then the direct current is inverted by inverter 5 into alternating current to drive electromotor 6. The prime mover 1 is not directly connected to the mechanical system, and all of the effective energy of the prime mover 1 is converted into electrical energy for use by the electric equipment. The series hybrid power system can work in various modes as follows according to working conditions. 1. Pure electric operation mode, that is, the generator is stopped, and only the battery provides power to the electromotor. 2. Pure engine drive mode, the electromotor is powered by a power generation unit composed of engine and generator, the battery neither absorbs energy nor emits energy, and is cut out from the system. 3. Powered by generator and battery. 4. The generator provides power to drive the electromotor to run and charge the battery.

The series hybrid power system allows the engine to operate in an efficient range with relatively high fuel economy and low pollutant emissions. The battery plays the role of "peak shaving and valley filling". When the developed power of the generator is greater than the required power of the electromotor, the battery-based energy storage device absorbs the excess power; and when the developed power of the generator is lower than the demand of the electromotor, the battery provides this part of power. The working conditions of the system are complex and diverse, requiring switching between various working modes, and the battery also needs to frequently connect and cut out the DC bus. The control of the power flow between various parts of the system is very important.

In the existing series hybrid power system, the battery is often connected in parallel to the DC side of the system via the DC-DC converter, and the energy is controlled by the converter to flow into and out of the battery. However, the DC-DC converter increases the size and cost of the system, increases the transmission links, reduces the efficiency of the system, and makes the control of the system more complicated.

In some series hybrid power systems, the battery is directly connected to the DC bus, and the output power of the engine-generator system is usually controlled according to the load power, so as to indirectly control the power of the battery. However, it is more difficult to control the battery current in this way.

SUMMARY

In order to solve the above problems in the prior art, the present invention provides a control method for a series hybrid power system or synergic electric power supply and a control device thereof, which reduces the hardware cost and improves power control accuracy.

In one aspect of the present invention, the control device for the series hybrid power system or synergic electric power supply is provided, including: a generator reference current value generating module and a generator current control module.

The generator reference current value generating module is configured to generate a reference current value of a generator according to an actual current value of an energy storage device, a reference current value of the energy storage device, an actual voltage value of a DC bus, and a reference voltage value of the DC bus.

The generator current control module is configured to generate a control signal of a rectifier in the series hybrid power system or synergic electric power supply according to the reference current value of the generator, the actual current value of the generator, and an actual angular velocity of the generator, thereby controlling the series hybrid power system or synergic electric power supply.

Preferably, the generator reference current value generating module includes: a first current value generating unit, a second current value generating unit, and a first adder.

The first current value generating unit is configured to generate a first current value according to the actual current value of the energy storage device and the reference current value of the energy storage device.

The second current value generating unit is configured to generate a second current value according to the actual voltage value of the DC bus and the reference voltage value of the DC bus.

The first adder is configured to add the first current value and the second current value to obtain the reference current value of the generator.

Preferably, the first current value generating unit includes: a first subtractor and a first regulator.

The first subtractor is configured to calculate a current deviation of the energy storage device according to the actual current value of the energy storage device and the reference current value of the energy storage device.

The first regulator is configured to generate the first current value according to the current deviation of the energy storage device.

Preferably, the second current value generating unit includes: a first delay subunit, a second subtractor, and a second regulator.

The first delay subunit is configured to delay the actual voltage value of the DC bus to obtain the reference voltage value of the DC bus.

The second subtractor is configured to calculate a voltage deviation of the DC bus according to the actual voltage value of the DC bus and the reference voltage value of the DC bus.

The second regulator is configured to generate the second current value according to the voltage deviation of the DC bus.

Preferably, the generator reference current value generating module includes: a first voltage deviation generating unit, a second voltage deviation generating unit, and a reference value generating unit.

The first voltage deviation generating unit is configured to generate a first voltage deviation according to the actual current value of the energy storage device and the reference current value of the energy storage device.

The second voltage deviation generating unit is configured to generate a second voltage deviation according to the actual voltage value of the DC bus, the reference voltage value of the DC bus, and the first voltage deviation.

The reference value generating unit is configured to generate the reference current value of the generator according to the second voltage deviation.

Preferably, the first voltage deviation generating unit includes: a third subtractor and a third regulator.

The third subtractor is configured to calculate the current deviation of the energy storage device according to the actual current value of the energy storage device and the reference current value of the energy storage device.

The third regulator is configured to generate the first voltage deviation according to the current deviation of the energy storage device.

Preferably, the second voltage deviation generating unit includes: a fourth subtractor.

The fourth subtractor is configured to calculate the second voltage deviation according to the actual voltage value of the DC bus and the first voltage deviation.

Preferably, the reference value generating unit includes: a second delay subunit, a fifth subtractor, and a fourth regulator.

The second delay subunit is configured to delay the actual voltage value of the DC bus to obtain the reference voltage value of the DC bus.

The fifth subtractor is configured to calculate a third voltage deviation according to the reference voltage value of the DC bus and the second voltage deviation.

The fourth regulator is configured to generate the reference current value of the generator according to the third voltage deviation.

Preferably, the generator current control module includes: a power factor control unit, a first coordinate transformation unit, a fifth regulator, a sixth regulator, a second coordinate transformation unit, and a space vector modulation unit.

The power factor control unit is configured to decompose the reference current value of the generator into reference values $i_d^*$ and $i_q^*$ of current components on d and q coordinate axes respectively, and make the current space vector coincide with the voltage space vector, thereby making the power factor of the generator to be 1.

The first coordinate transformation unit is configured to generate actual values $i_d$ and $i_q$ of the current components on the d and the q coordinate axes, respectively, according to an actual phase current and an actual angular velocity of the generator.

The fifth regulator is configured to generate a reference value $u_q$ of voltage component on the q coordinate axis according to a deviation of the reference value $i_q^*$ of the current component on the q coordinate axis from the actual value $i_q$ of the current component.

The sixth regulator is configured to generate a reference value $u_d$ of the voltage component on the d coordinate axis according to a deviation of the reference value $i_d^*$ the current component on the d coordinate axis from the actual value $i_d$ of the current component.

The second coordinate transformation unit is configured to generate reference voltage values $u_\alpha$ and $u_\beta$ in the $\alpha$, $\beta$ stationary coordinate system according to the reference values $u_d$ and $u_q$ of the voltage component on the d and q coordinate axes, respectively.

The space vector modulation unit is configured to perform space vector modulation according to the reference voltage values $u_\alpha$ and $u_\beta$ in the $\alpha$, $\beta$ stationary coordinate system to generate the control signal of the rectifier in the series hybrid power system or synergic electric power supply, thereby controlling the series hybrid power system or synergic electric power supply.

Preferably, the second current value generating unit further includes: a first latch.

The first latch is configured to latch the actual voltage value of the DC bus.

Preferably, the reference value generating unit further includes: a second latch.

The second latch is configured to latch the actual voltage value of the DC bus.

Preferably, the series hybrid power system or synergic electric power supply includes: a prime mover, a generator, a rectifier, a filter capacitor, a contactor, an energy storage device, and a DC bus.

The prime mover runs coaxially with the generator to drive the generator to generate electricity. The electrical terminal of the generator is connected to the rectifier, the rectifier rectifies the alternating current generated by the generator into direct current. The output side of the rectifier is connected to the DC bus, and the filter capacitor is connected in parallel with the DC bus for filtering the output of the rectifier. The energy storage device is connected in parallel with the DC bus via the contactor. The DC bus is connected in parallel with a load.

Among them, the load is a resistive load, and/or an inductive load, and/or a constant power load.

Preferably, the control device further includes: a first current transformer, a second current transformer, a third current transformer, a voltage transformer, and an angular velocity sensor.

The first current transformer is configured for real-time collection of the actual current value of the energy storage device.

The second current transformer and the third current transformer are configured for real-time collection of any two-phase current of the generator.

The voltage transformer is configured for real-time collection of the actual voltage value of the DC bus.

The angular velocity sensor is configured to measure the angular velocity of the generator in real time.

Preferably, the control device further includes: a control module.

The control module is configured to determine the reference voltage value of the DC bus and the reference current value of the energy storage device according to a preset control strategy, and to disconnect or close the contactor.

In another aspect of the present invention, a control method of a series hybrid power system or synergic electric power supply is provided, based on the above-described control device of the series hybrid power system or synergic electric power supply, the method includes the following steps.

Step S10, determining whether the energy storage device needs to connect the DC bus according to a preset control strategy; if so, proceeding to step S20; otherwise, proceeding to step S30.

Step S20, delaying the actual voltage value of the DC bus as a reference voltage value of the DC bus, calculating a reference current value of the energy storage device according to a preset calculation method, and closing the contactor.

Step S30, determining whether an emergency disconnection is required; if yes, proceeding to step S40; otherwise, proceeding to step S50.

Step S40, latching the actual voltage value of the DC bus as the reference voltage value of the DC bus, keeping the reference current value of the energy storage device unchanged, and disconnecting the contactor.

Step S50, latching the actual voltage value of the DC bus as the reference voltage value of the DC bus, setting the reference current value of the energy storage device to 0; disconnecting the contactor when the actual current value of the energy storage device is lower than a preset current threshold; and resetting the first regulator or the third regulator.

Compared with the closest prior art, the present invention has at least the following beneficial effects.

The control device of the series hybrid power system or synergic electric power supply provided by the present invention adopts three negative feedback closed-loop control loops of DC bus voltage, energy storage device current and generator current. The output of DC bus voltage control loop and the output of the energy storage device current control loop are connected in parallel to generate a command of the generator current control loop; or the output of the energy storage device current control loop is connected in parallel with the actual voltage value of the DC bus as a feedback of the DC bus voltage control loop, and then the output of the DC bus voltage control loop is used as a command of the generator current control loop. The control method and the control device of the present invention can maintain the stability of the DC bus voltage when the energy storage device needs to be connected, normally disconnected or emergency disconnected, and can prevent overcharging or overdischarging of the energy storage device.

The present invention can realize closed-loop power control of two power supplies with different characteristics and adaptive switching of the system working mode and the structure, which overcomes the problems of complex structure or low power control precision of the existing series hybrid power system or synergic electric power supply.

DETAILED DESCRIPTION OF THE EMBODIMENTS

Preferred embodiments of the present invention will be described below with reference to the drawings. Those skilled in the art should understand that these embodiments are merely used to illustrate the technical principles of the present invention, and are not intended to limit the protective scope of the present invention.

It should be noted that in the description of the present invention, the terms "first", "second", "third", etc. are merely used to facilitate the description, rather than indicate or imply the relative importance of the device, element or parameter, and therefore cannot be understood as a limitation of the present invention.

The present invention relates to a series hybrid power system or synergic electric power supply, in which the energy storage device is directly connected in parallel with the output of the rectifier without passing through the DC-DC converter, and the current variation of the energy storage device is used as the input of the regulator to generate the reference current value of the generator, which can also prevent overcharging or overdischarging of the battery. The control device of the present invention has three feedback elements of DC bus voltage, energy storage device current and generator current. The output of the DC bus voltage control loop and the output of the energy storage device current control loop are connected in parallel to generate a command of the generator current control loop (i.e., "the reference current value of the generator" mentioned below); or the output of the energy storage device current control loop is connected in parallel with the measured or recognized actual voltage value of the DC bus as a feedback of the DC bus voltage control loop, and then the output of the DC bus voltage control loop is used as a command of the generator current control loop. When the energy storage device is connected, the feedback voltage value of the DC bus is directly used as a reference voltage value of the DC bus or as a reference voltage value of the DC bus after being affected by a link with a delay effect (such as links of delay, filtering, inertia or growth slope limit, etc.). When the energy storage device is cut out, the series hybrid power system latches the DC bus voltage before the energy storage device is cut out and the DC bus voltage is used as a reference voltage value of the DC bus; and after the energy storage device is cut out, the series hybrid power system resets the regulator state in the energy storage device current control loop.

Figure 1:
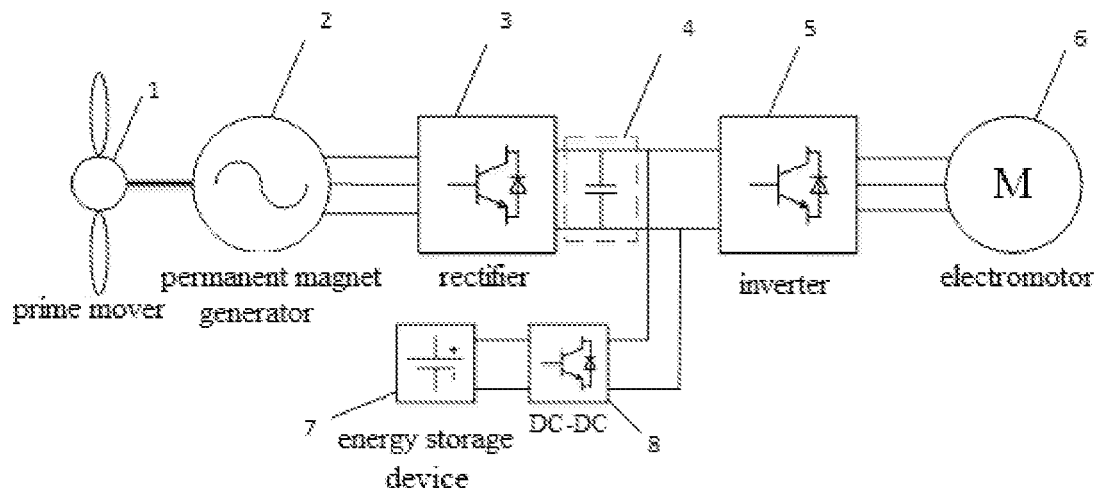
FIG. 1 is a structural schematic diagram of a series hybrid power system in the prior art.
Figure 2:
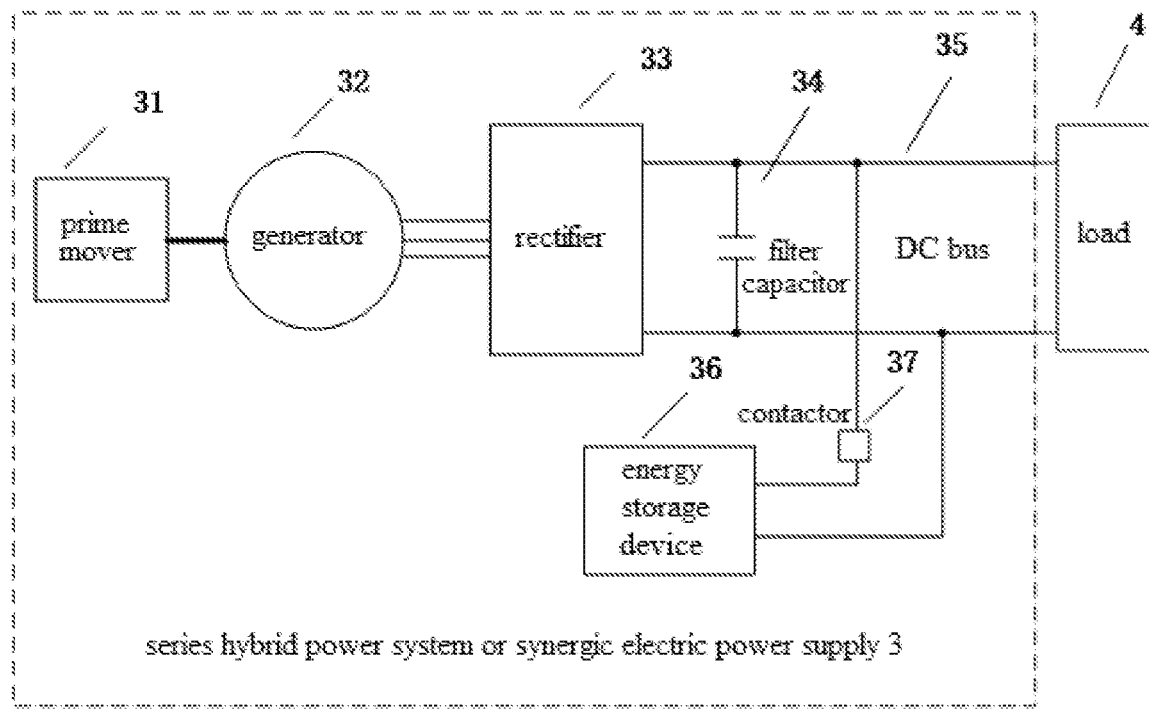
FIG. 2 is a structural schematic diagram of a series hybrid power system or synergic electric power supply according to an embodiment of the present invention.

FIG. 2 is a structural schematic diagram of a series hybrid power system or synergic electric power supply according to an embodiment of the present invention. As shown in FIG. 2, the series hybrid power system or synergic electric power supply 3 includes prime mover 31, generator 32, rectifier 33, filter capacitor 34, DC bus 35, energy storage device 36, and contactor 37.

Among them, the prime mover 31 (in this embodiment is a diesel engine) runs coaxially with the generator 32 (in this embodiment is a permanent magnet generator) to drive the generator 32 to generate electricity. The electrical terminal of the generator 32 is connected to the rectifier 33, the rectifier 33 (in this embodiment is a three-phase full-bridge controlled rectifier, which adopts a PWM controllable rectification method) rectifies alternating current generated by the generator 32 into direct current (DC). The output side of the rectifier 33 is connected to the DC bus 35, and the filter capacitor 34 is connected in parallel with the DC bus 35 for filtering the output of the rectifier 33. The energy storage device 36 is connected in parallel with the DC bus 35 via the contactor 37. The DC bus 35 is connected in parallel with load 4. The load 4 is a resistive load (such as incandescent lamp, resistance furnace, oven, electric water heater, etc.), and/or an inductive load (such as transformer, electromotor, etc.), and/or a constant power load (such as rolling mill, paper machine, various machine tools, etc.).

Figure 3:
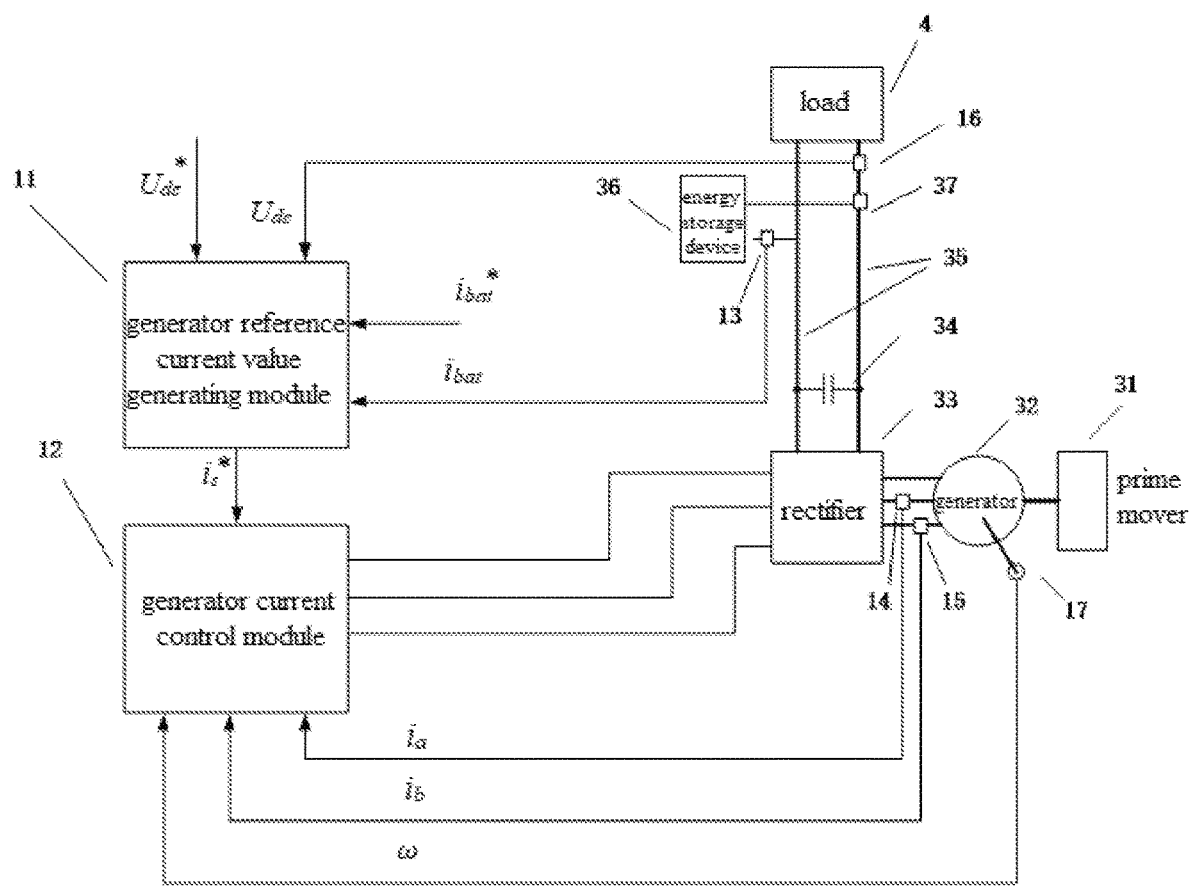
FIG. 3 is a structural schematic diagram of a control device of a series hybrid power system or synergic electric power supply according to a first embodiment of the present invention.

FIG. 3 is a structural schematic diagram of a control device of a series hybrid power system or a synergic electric power supply according to a first embodiment of the present invention. As shown in FIG. 3, the control device 1 of the series hybrid power system or synergic electric power supply of this embodiment includes: generator reference current value generating module 11 and generator current control module 12, first current transformer 13, second current transformer 14, third current transformer 15, voltage transformer 16, angular velocity sensor 17, and control module (not shown in the figures).

Among them, the generator reference current value generating module 11 is configured to generate reference current value $i_s^*$ of the generator 32 according to actual current value $i_{bat}$ of the energy storage device 36, reference current value $i_{bat}^*$ of the energy storage device 36, actual voltage value $U_{dc}$ of the DC bus 35, and reference voltage value $U_{dc}^*$ of the DC bus 35. The generator current control module 12 is configured to generate a control signal of the rectifier 33 in the series hybrid power system or synergic electric power supply according to the reference current value $i_s^*$ of the generator 32, actual values $i_a$ and $i_b$ of any two-phase current of the generator 32, and actual angular velocity ω of the generator 32, thereby controlling the series hybrid power system or synergic electric power supply. The first current transformer 13 is configured for real-time collection of the actual current value $i_{bat}$ of the energy storage device. The second current transformer 14 and the third current transformer 15 are configured for real-time collection of actual values $i_a$ and $i_b$ of any two-phase current of the generator 32. The voltage transformer 16 is configured for real-time collection of the actual voltage value $U_{dc}$ of the DC bus 35. The angular velocity sensor 17 is configured to measure the angular velocity ω of the generator 32 in real time. The control module (in this embodiment is a digital signal processor) is configured to determine the reference voltage value $U_{dc}^*$ of the DC bus 35 and the reference current value $i_{bat}^*$ of the energy storage device 36 according to a preset control strategy, and to disconnect or close the contactor 37.

Figure 4:
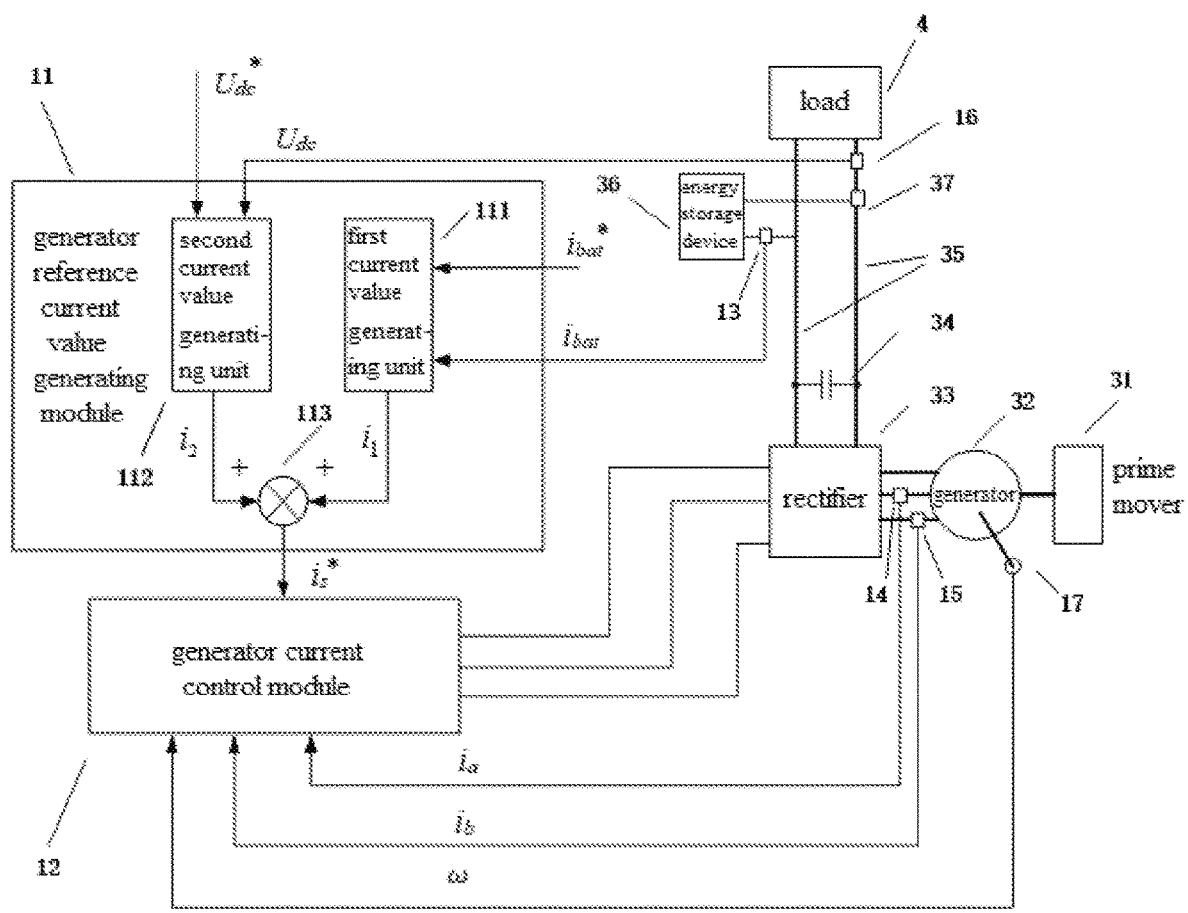
FIG. 4 is a structural schematic diagram of a control device of a series hybrid power system or synergic electric power supply according to a second embodiment of the present invention.

FIG. 4 is a structural schematic diagram of a control device of a series hybrid power system or a synergic electric power supply according to the second embodiment of the present invention. As shown in FIG. 4, the control device 1 of the series hybrid power system or synergic electric power supply of this embodiment includes: generator reference current value generating module 11 and generator current control module 12, first current transformer 13, second current transformer 14, third current transformer 15, voltage transformer 16, angular velocity sensor 17, and control module (not shown in the figures).

Among them, the generator current control module 12, the first current transformer 13, the second current transformer 14, the third current transformer 15, the voltage transformer 16, the angular velocity sensor 17, and the control module are respectively the same as each corresponding module in the FIG. 3, and will not be described herein.

In this embodiment, the generator current reference value generating module 11 specifically includes: first current value generating unit 111, second current value generating unit 112, and first adder 113.

Among them, the first current value generating unit 111 is configured to generate first current value $i_1$ according to the actual current value $i_{bat}$ of the energy storage device and the reference current value $i_{bat}^*$ of the energy storage device. The second current value generating unit 112 is configured to generate second current value $i_2$ according to the actual voltage value $U_{dc}$ of the DC bus and the reference voltage value $U_{dc}^*$ of the DC bus. The first adder 113 is configured to add the first current value $i_1$ and the second current value $i_2$ to obtain the reference current value $i_s^*$ of the generator.

Figure 5:
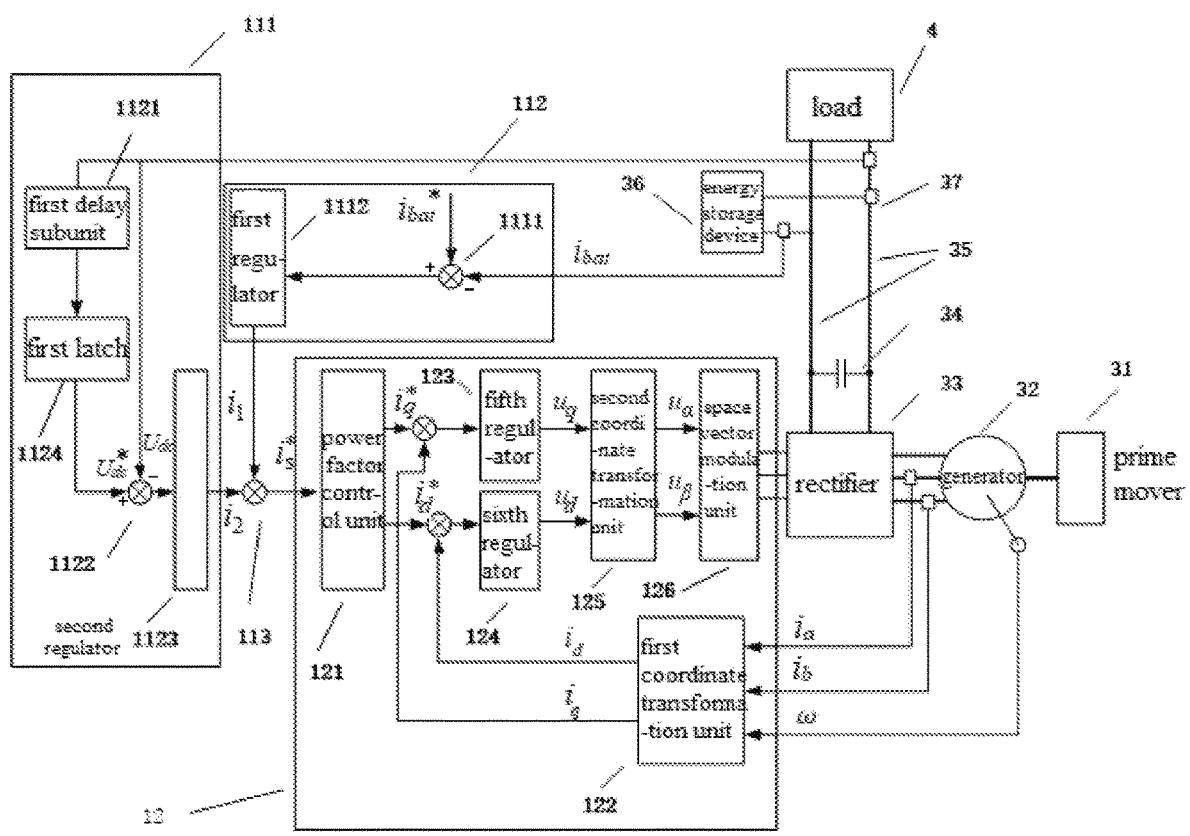
FIG. 5 is a schematic diagram showing a further refined structure of the control device of the series hybrid power system or synergic electric power supply according to the second embodiment of the present invention.

FIG. 5 is a schematic diagram showing a further refined structure of the control device of the series hybrid power system or synergic electric power supply according to the second embodiment of the present invention. As shown in FIG. 5, in this embodiment, the first current value generating unit 111 includes: first subtractor 1111 and first regulator 1112.

Among them, the first subtractor 1111 is configured to calculate a current deviation of the energy storage device according to the actual current value $i_{bat}$ of the energy storage device and the reference current value $i_{bat}^*$ of the energy storage device. The first regulator 1112 is configured to generate the first current value $i_1$ according to the current deviation of the energy storage device.

In this embodiment, the second current value generating unit 112 includes: first delay subunit 1121, second subtractor 1122, second regulator 1123, and first latch 1124.

Among them, the first delay subunit 1121 is configured to delay the actual voltage value of the DC bus to obtain the reference voltage value of the DC bus. The second subtractor 1122 is configured to calculate a voltage deviation of the DC bus according to the actual voltage value of the DC bus and the reference voltage value of the DC bus. The second regulator 1123 is configured to generate the second current value $i_2$ according to the voltage deviation of the DC bus. The first latch 1124 is configured to latch the actual voltage value of the DC bus. In this embodiment, the first latch 1124 is enabled before the energy storage device is cut out from the series hybrid power system, and then the voltage delayed by the first delay subunit 1121 is latched.

In this embodiment, the generator current control module 12 includes: power factor control unit 121, first coordinate transformation unit 122, fifth regulator 123, sixth regulator 124, second coordinate transformation unit 125, and space vector modulation unit 126.

Among them, the power factor control unit 121 is configured to decompose the reference current value of the generator into reference values $i_d^*$ and $i_q^*$ of the current components on d and q coordinate axes respectively, and make the current space vector coincide with the voltage space vector, thereby making the power factor of the generator to be 1. The first coordinate transformation unit 122 is configured to generate actual values $i_d$ and $i_q$ of the current components on the d and the q coordinate axes, respectively, according to an actual phase current and an angular velocity of the generator. The fifth regulator 123 is configured to generate a reference value $u_q$ of voltage component on the q coordinate axis according to a deviation of the reference value $i_q^*$ of the current component on the q coordinate axis from the actual value $i_q$ of the current component. The sixth regulator 124 is configured to generate a reference value $u_d$ of the voltage component on the d coordinate axis according to a deviation of the reference value $i_d^*$ of the current component on the d coordinate axis from the actual value $i_d$ of the current component. The second coordinate transformation unit 125 is configured to generate reference voltage values $u_\alpha$ and $u_\beta$ in the α, β stationary coordinate system according to the reference values $u_d$ and $u_q$ of the voltage component on the d and q coordinate axes, respectively. The space vector modulation unit 126 is configured to perform space vector modulation according to the reference voltage values $u_\alpha$ and $u_\beta$ in the α, β stationary coordinate system to generate the control signal of the rectifier in the series hybrid power system or synergic electric power supply, thereby controlling the series hybrid power system or synergic electric power supply.

In this embodiment, the control of inner current loop of the generator adopts unit power factor control, and a common control strategy of the current loop such as field-oriented control or direct torque control can also be used in practical applications.

In this embodiment, the regulators all use proportional-integral (PI) regulator and the output of the regulator is subjected to amplitude limiting. When the contactor is closed, the energy storage device (in this embodiment is a lithium battery) is connected to the DC bus. When the connection is completed and is worked, the actual voltage value $U_{dc}$ of the DC bus obtained by sampling or identification is delayed and then used as the reference value $U_{dc}^*$ of the outer voltage loop of the DC bus. At the same time, the actual voltage value $U_{dc}$ of the DC bus obtained by sampling or identification is also used as a feedback value of the outer voltage loop of the DC bus. According to the feature of "battery can be equivalent to a large capacitor", the DC voltage is clamped to maintain the stability of the bus voltage. The second current value $i_2$ is generated by the second regulator in the outer voltage loop of the DC bus; and the output of the second regulator in the outer voltage loop of the DC bus is subjected to amplitude limiting (a regulator with amplitude limiting function can also be used). At the same time, the magnitude of the current of the output of the battery, i.e., the reference current value $i_{bat}^*$ of the battery, is determined according to the preset control strategy. The actual current value $i_{bat}$ of the battery obtained by sampling or identification is used as a feedback value of the outer current loop of the battery. The first current value $i_1$ is generated by the first regulator in the outer current loop of the battery; and the output of the first regulator in the outer current loop of the battery is subjected to amplitude limiting. The first current value $i_1$ and the second current value $i_2$ are added together to obtain the reference current value $i_s^*$ of the generator as a control command of the generator current control module. The DC bus voltage is stable and the battery current is precisely controllable.

When the battery needs to be disconnected (or cut out), the voltage value $U_{dc}$ of the DC bus collected in real time is first latched as the reference voltage value $U_{dc}^*$ of the DC bus; and then the reference value $i_{bat}^*$ of the energy storage device current control loop is set to zero, and the actual current value $i_{bat}$ of the battery will decrease rapidly. When the actual current value is reduced to a certain range (i.e., less than the preset current threshold), the contactor is disconnected to cut out the battery, and the DC bus voltage can still maintain stable.

In an emergency state (such as the battery fault alarm of the battery management system), the state change signal or trigger signal of the contactor can also be detected; the DC bus voltage $U_{dc}$ collected by the voltage sensor is latched as the reference voltage value $U_{dc}^*$ of the DC bus, without changing the reference current value $i_{bat}^*$ of the battery; and then the contactor is directly turned off to allow the battery to exit the system, and the DC bus voltage can still remain stable.

Figure 6:
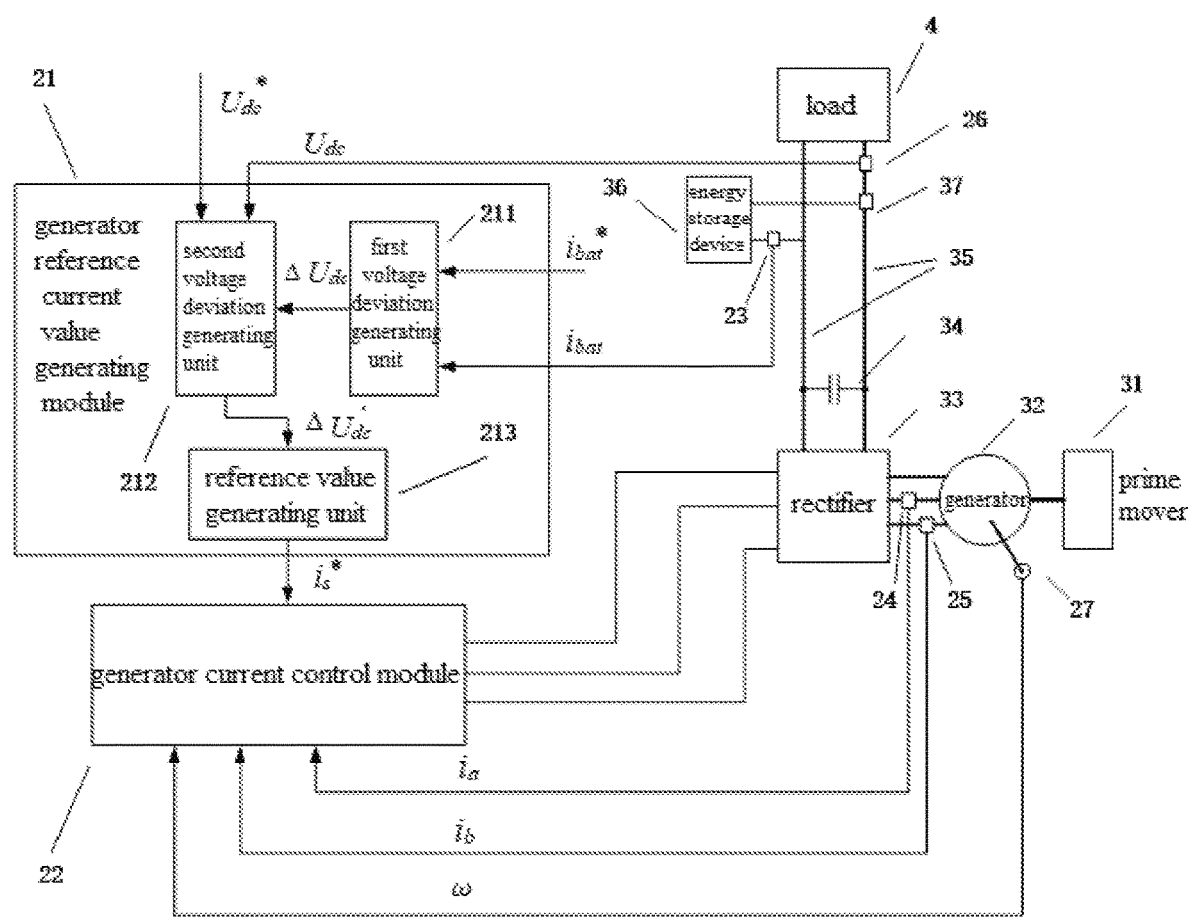
FIG. 6 is a structural schematic diagram of a control device of a series hybrid power system or synergic electric power supply according to a third embodiment of the present invention.

FIG. 6 is a structural schematic diagram of the control device of the series hybrid power system or the synergic electric power supply according to the third embodiment of the present invention. As shown in FIG. 6, the control device 2 of the series hybrid power system or synergic electric power supply of this embodiment includes: generator reference current value generating module 21 and generator current control module 22, first current transformer 23, second current transformer 24, third current transformer 25, voltage transformer 26, angular velocity sensor 27, and control module (not shown in the figure).

Among them, the generator current control module 22, the first current transformer 23, the second current transformer 24, the third current transformer 25, the voltage transformer 26, the angular velocity sensor 27, and the control module are respectively the same as each corresponding module in the FIG. 4, and will not be described herein.

Different from FIG. 4 is that, the generator current reference value generating module 21 in this embodiment includes: first voltage deviation generating unit 211, second voltage deviation generating unit 212, and reference value generating unit 213.

Among them, the first voltage deviation generating unit 211 is configured to generate first voltage deviation $\Delta U_{dc}$ according to the actual current value $i_{bat}$ of the energy storage device and the reference current value $i_{bat}^*$ of the energy storage device. The second voltage deviation generating unit 212 is configured to generate second voltage deviation $\Delta U_{dc}'$ according to the actual voltage value $U_{dc}$ of the DC bus, the reference voltage value $U_{dc}^*$ of the DC bus, and the first voltage deviation $\Delta U_{dc}$. The reference value generating unit 213 is configured to generate reference current value $i_s^*$ of the generator according to the second voltage deviation $\Delta U_{dc}'$.

Figure 7:
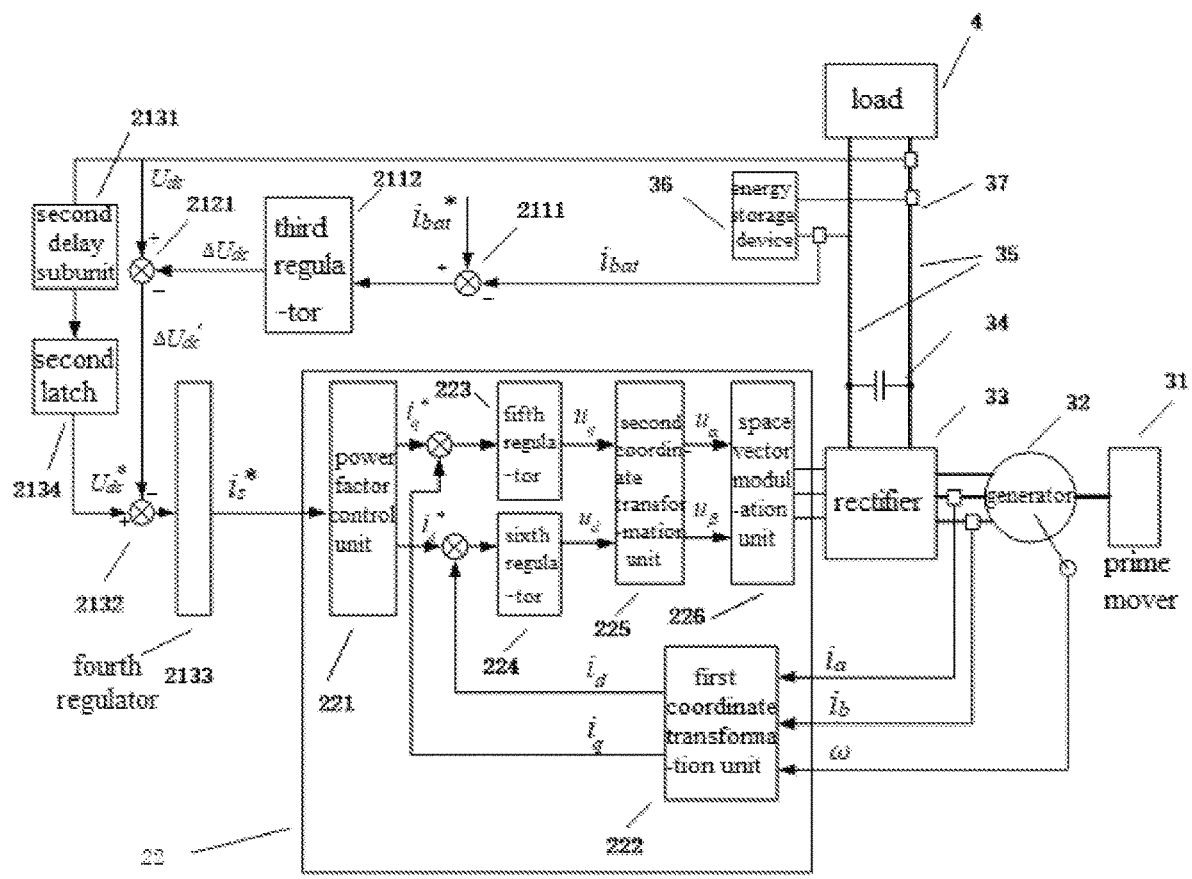
FIG. 7 is a schematic diagram showing a further refined structure of the control device of the series hybrid power system or synergic electric power supply according to the third embodiment of the present invention.

FIG. 7 is a schematic diagram showing a further refined structure of the control device of the series hybrid power system or the synergic electric power supply according to the third embodiment of the present invention. As shown in FIG. 7, in this embodiment, the first voltage deviation generating unit 211 includes third subtractor 2111 and third regulator 2112.

Among them, the third subtractor 2111 is configured to calculate current deviation of the energy storage device according to the actual current value $i_{bat}$ of the energy storage device and the reference current value $i_{bat}*$ of the energy storage device. The third regulator 2112 is configured to generate first voltage deviation $\Delta U_{dc}$ according to the current deviation of the energy storage device.

In this embodiment, the second voltage deviation generating unit 212 includes: a fourth subtractor 2121. The fourth subtractor 2121 is configured to calculate second voltage deviation $\Delta U_{dc}'$ according to the actual voltage value $U_{dc}$ of the DC bus and the first voltage deviation $\Delta U_{dc}$.

In this embodiment, the reference value generating unit 213 includes: second delay subunit 2131, fifth subtractor 2132, fourth regulator 2133, and second latch 2134.

Among them, the second delay subunit 2131 is configured to delay the actual voltage value $U_{dc}$ of the DC bus to obtain the reference voltage value $U_{dc}*$ of the DC bus. The fifth subtractor 2132 is configured to calculate third voltage deviation according to the reference voltage value $U_{dc}*$ of the DC bus and the second voltage deviation $\Delta U_{dc}'$. The fourth regulator 2133 is configured to generate the reference current value $i_s*$ of the generator according to the third voltage deviation. The second latch 2134 is configured to latch the actual voltage value $U_{dc}$ of the DC bus. In this embodiment, the second latch 2134 is enabled before the energy storage device is cut out from the system, and then the voltage delayed by the second delay subunit 2131 is latched.

In this embodiment, the energy storage device is lithium battery, and the regulator of the outer voltage loop of the DC bus, the battery current regulator, and the regulator of the generator inner current loop still use the proportional-integral (PI) regulator and the output of the regulator is subjected to amplitude limiting.

When the contactor is closed, the lithium battery is connected to the DC bus, and the actual voltage value $U_{dc}$ of the DC bus is measured by the voltage transformer. The control module calculates the reference current value $i_{bat}*$ of the battery according to a preset control strategy (according to system status and power demand), and the actual current value of the battery is a current signal collected by the current transformer. The output of the third regulator (i.e., the first voltage deviation $\Delta U_{dc}$) and the actual voltage value $U_{dc}$ of the DC bus are connected in parallel to generate an output (i.e., the second voltage deviation $\Delta U_{dc}'$) as a feedback of the DC bus voltage control loop. The actual voltage value $U_{dc}$ of the DC bus collected in real time is used as reference value $U_{dc}*$ of the DC bus after being delayed. At this time, the DC bus voltage is stable and the power distribution is precisely controllable.

When the battery needs to be cut out, the current DC bus voltage value is latched; and then the reference value $i_{bat}*$ of the energy storage device current control loop is set to zero, and the actual current value $i_{bat}$ of the battery will decrease rapidly. When the actual current value of the battery is reduced to a certain range (i.e., less than the preset current threshold), the contactor is disconnected to cut out the battery, and at this time, the DC bus voltage can still maintain stable.

In an emergency state, the state change signal or trigger signal of the contactor can also be detected; the voltage signal collected by the voltage sensor is latched as the reference value for the outer loop of the DC bus voltage, without changing the reference current value of the battery; and then the contactor is directly turned off to allow the battery to exit the system, and the DC bus voltage can still remain stable.

Based on the same technical concept as the above-described control device of the series hybrid power system or synergic electric power supply, the present invention also proposes a control method of the series hybrid power system or synergic electric power supply.

Figure 8:
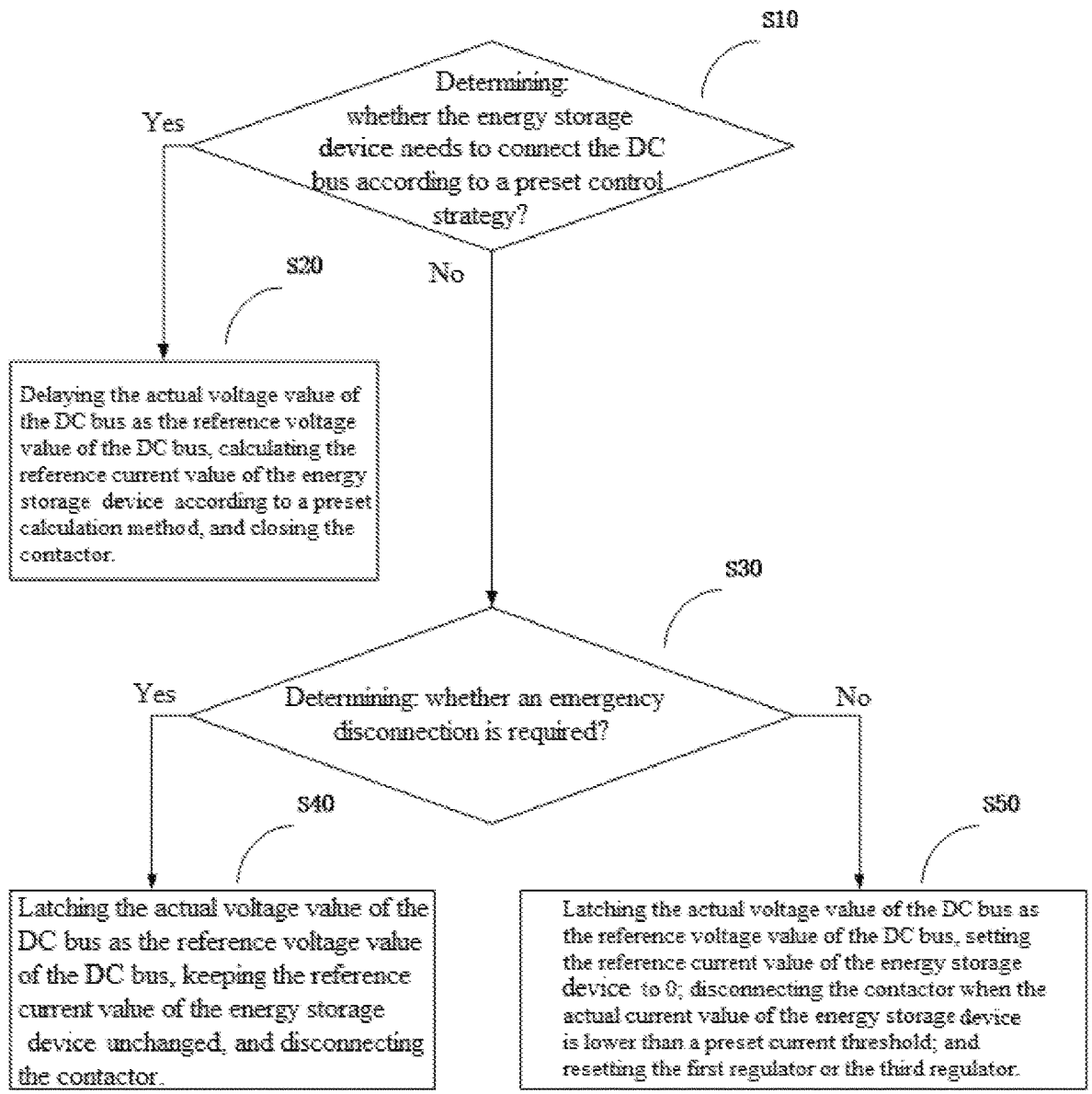
FIG. 8 is a schematic diagram showing the main steps of a control method for series hybrid power system or synergic electric power supply according to an embodiment of the present invention.

FIG. 8 is a schematic diagram showing the main steps of the control method of the series hybrid power system or synergic electric power supply according to an embodiment of the present invention. As shown in FIG. 8, the control method of this embodiment includes the following steps.

Step S10, determining whether the energy storage device needs to connect the DC bus according to a preset control strategy; if so, proceeding to step S20; otherwise, proceeding to step S30.

Step S20, delaying the actual voltage value of the DC bus as a reference voltage value of the DC bus, calculating a reference current value of the energy storage device according to a preset calculation method, and closing the contactor.

Step S30, determining whether an emergency disconnection is required; if yes, proceeding to step S40; otherwise, proceeding to step S50.

Step S40, latching the actual voltage value of the DC bus as the reference voltage value of the DC bus, keeping the reference current value of the energy storage device unchanged, and disconnecting the contactor.

Step S50, latching the actual voltage value of the DC bus as the reference voltage value of the DC bus, setting the reference current value of the energy storage device to 0; disconnecting the contactor when the actual current value of the energy storage device is lower than a preset current threshold; and resetting the first regulator or the third regulator (the first regulator is reset when the control device as shown in FIG. 5 is used, and the third regulator is reset when the control device as shown in FIG. 7 is used).

In the above embodiment, although the steps are described in the above-described order, those skilled in the art can understand that in order to implement the effects of this embodiment, different steps do not have to be executed in this order, which may be executed simultaneously (in parallel) or in reverse order, and these simple variations are all within the protective scope of the present invention.

Those skilled in the art should be aware that the method steps of the various examples described in the embodiments disclosed herein can be implemented by electronic hardware, computer software, or a combination of the two modes. In order to clearly illustrate the interchangeability of electronic hardware and software, the components and steps of the various examples have been generally described in terms of functionality in the above description. Whether these functions are performed in electronic hardware or software depends on the specific application and design constraints of the technical solution. Those skilled in the art can use different methods for each particular application to implement the described functions, but such implementation shall not be considered to be beyond the scope of the present invention.

Heretofore, the technical solutions of the present invention have been described in the preferred embodiments with reference to the drawings. However, it is readily understood by those skilled in the art that the protective scope of the present invention is obviously not limited to these specific embodiments. Those skilled in the art can make equivalent modifications or substitutions to the related technical features without departing from the principles of the present invention, and such modifications and substitutions will fall within the protective scope of the present invention.

What is claimed is:

1. A control device of a series hybrid power system or a synergic electric power supply, comprising a generator reference current value generating module and a generator current control module; wherein
the generator reference current value generating module is configured to generate a reference current value of a generator according to an actual current value of an energy storage device, a reference current value of the energy storage device, an actual voltage value of a DC bus, and a reference voltage value of the DC bus; and
the generator current control module is configured to generate a control signal of a rectifier in the series hybrid power system or the synergic electric power supply according to the reference current value of the generator, an actual current value of the generator, and an actual angular velocity of the generator, thereby controlling the series hybrid power system or the synergic electric power supply.

2. The control device according to claim 1, wherein the generator reference current value generating module comprises: a first current value generating unit, a second current value generating unit, and a first adder; and wherein
the first current value generating unit is configured to generate a first current value according to the actual current value of the energy storage device and the reference current value of the energy storage device;
the second current value generating unit is configured to generate a second current value according to the actual voltage value of the DC bus and the reference voltage value of the DC bus; and
the first adder is configured to add the first current value and the second current value to obtain the reference current value of the generator.

3. The control device according to claim 2, wherein the first current value generating unit comprises: a first subtractor and a first regulator; and wherein
the first subtractor is configured to calculate a current deviation of the energy storage device according to the actual current value of the energy storage device and the reference current value of the energy storage device; and
the first regulator is configured to generate the first current value according to the current deviation of the energy storage device.

4. The control device according to claim 3, wherein the second current value generating unit comprises: a first delay subunit, a second subtractor, and a second regulator; and wherein
the first delay subunit is configured to delay the actual voltage value of the DC bus to obtain the reference voltage value of the DC bus;
the second subtractor is configured to calculate a voltage deviation of the DC bus according to actual voltage value of the DC bus and the reference voltage value of the DC bus; and
the second regulator is configured to generate the second current value according to the voltage deviation of the DC bus.

5. The control device according to claim 1, wherein the generator reference current value generating module comprises: a first voltage deviation generating unit, a second voltage deviation generating unit, and a reference value generating unit; and wherein
the first voltage deviation generating unit is configured to generate a first voltage deviation according to the actual current value of the energy storage device and the reference current value of the energy storage device;
the second voltage deviation generating unit is configured to generate a second voltage deviation according to the actual voltage value of the DC bus, the reference voltage value of the DC bus, and the first voltage deviation; and
the reference value generating unit is configured to generate the reference current value of the generator according to the second voltage deviation.

6. The control device according to claim 5, wherein the first voltage deviation generating unit comprises: a third subtractor and a third regulator; and wherein
the third subtractor is configured to calculate a current deviation of the energy storage device according to the actual current value of the energy storage device and the reference current value of the energy storage device; and
the third regulator is configured to generate the first voltage deviation according to the current deviation of the energy storage device.

7. The control device according to claim 6, wherein the second voltage deviation generating unit comprises: a fourth subtractor; and wherein
the fourth subtractor is configured to calculate the second voltage deviation according to the actual voltage value of the DC bus and the first voltage deviation.

8. The control device according to claim 7, wherein the reference value generating unit comprises: a second delay subunit, a fifth subtractor, and a fourth regulator; and wherein
the second delay subunit is configured to delay the actual voltage value of the DC bus to obtain the reference voltage value of the DC bus;
the fifth subtractor is configured to calculate a third voltage deviation according to the reference voltage value of the DC bus and the second voltage deviation; and
the fourth regulator is configured to generate the reference current value of the generator according to the third voltage deviation.

9. The control device according to claim 1, wherein the generator current control module comprises: a power factor control unit, a first coordinate transformation unit, a fifth regulator, a sixth regulator, a second coordinate transformation unit, and a space vector modulation unit; and wherein
the power factor control unit is configured to decompose the reference current value of the generator into reference values $i_d^*$ and $i_q^*$ of current components on d and q coordinate axes respectively, and make a current space vector coincide with a voltage space vector, thereby making a power factor of the generator to be 1;
the first coordinate transformation unit is configured to generate actual values $i_d$ and $i_q$ of the current components on the d and the q coordinate axes, respectively, according to an actual phase current and an angular velocity of the generator;
the fifth regulator is configured to generate a reference value $u_q$ of voltage component on the q coordinate axis according to a deviation of the reference value $i_q^*$ of the current component on the q coordinate axis from the actual value $i_q$ of the current component;
the sixth regulator is configured to generate a reference value $u_d$ of voltage component on the d coordinate axis according to a deviation of the reference value $i_d^*$ of the current component on the d coordinate axis from the actual value $i_d$ of the current component;

the second coordinate transformation unit is configured to generate reference voltage values $u_\alpha$ and $u_\beta$ in an $\alpha$, $\beta$ stationary coordinate system according to the reference values $u_d$ and $u_q$ of the voltage components on the d and the q coordinate axes, respectively; and the space vector modulation unit is configured to perform a space vector modulation according to the reference voltage values $u_\alpha$ and $u_\beta$ in the $\alpha$, $\beta$ stationary coordinate system to generate the control signal of the rectifier in the series hybrid power system or synergic electric power supply, thereby controlling the series hybrid power system or the synergic electric power supply.

10. The control device according to claim 4, wherein the second current value generating unit further comprises: a first latch; wherein the first latch is configured to latch the actual voltage value of the DC bus.

11. The control device according to claim 8, characterized in that, the reference value generating unit further comprises: a second latch; wherein the second latch is configured to latch the actual voltage value of the DC bus.

12. The control device according to claim 1, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier, the energy storage device is connected in parallel with the DC bus via the contactor; and the DC bus is connected in parallel with a load; and wherein the load is a resistive load, and/or an inductive load, and/or a constant power load.

13. The control device according to claim 12, wherein the control device further comprises: a first current transformer, a second current transformer, a third current transformer, a voltage transformer, and an angular velocity sensor; wherein the first current transformer is configured for real-time collection of the actual current value of the energy storage device;

the second current transformer and the third current transformer are configured for real-time collection of any two-phase current of the generator;

the voltage transformer is configured for real-time collection of the actual voltage value of the DC bus; and the angular velocity sensor is configured to measure the angular velocity of the generator in real time.

14. The control device according to claim 13, wherein the control device further comprises: a control module; and wherein the control module is configured to determine the reference voltage value of the DC bus and the reference current value of the energy storage device according to a preset control strategy, and to disconnect or close the contactor.

15. A control method of a series hybrid power system or synergic electric power supply, wherein based on the control device of the series hybrid power system or the synergic electric power supply according to claim 1, the control method comprises the following steps:

step S10, determining whether the energy storage device needs to connect the DC bus according to a preset control strategy; if yes, proceeding to step S20; otherwise, proceeding to step S30;

step S20, delaying the actual voltage value of the DC bus as the reference voltage value of the DC bus, calculating the reference current value of the energy storage device according to a preset calculation method, and closing the contactor;

step S30, determining whether an emergency disconnection is required; if yes, proceeding to step S40; otherwise, proceeding to step S50;

step S40, latching the actual voltage value of the DC bus as the reference voltage value of the DC bus, keeping the reference current value of the energy storage device unchanged, and disconnecting the contactor; and step S50, latching the actual voltage value of the DC bus as the reference voltage value of the DC bus, setting the reference current value of the energy storage device to 0; disconnecting the contactor when the actual current value of the energy storage device is lower than a preset current threshold; and resetting the first regulator or the third regulator.

16. The control device according to claim 2, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier; the energy storage device is connected in parallel with the DC bus via the contactor; and the DC bus is connected in parallel with a load; and wherein the load is a resistive load, and/or an inductive load, and/or a constant power load.

17. The control device according to claim 3, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier; the energy storage device is connected in parallel with the DC bus via the contactor; and the DC bus is connected in parallel with a load; and wherein the load is a resistive load, and/or an inductive load, and/or a constant power load.

18. The control device according to claim 4, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier; the energy storage device is connected in parallel with the DC bus via the contactor; and the DC bus is connected in parallel with a load; and wherein the load is a resistive load, and/or an inductive load, and/or a constant power load.

19. The control device according to claim 5, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier; the energy storage device is connected in parallel with the DC bus via the contactor; and the DC bus is connected in parallel with a load; and wherein the load is a resistive load, and/or an inductive load, and/or a constant power load.

20. The control device according to claim 6, wherein the series hybrid power system or the synergic electric power supply comprises: a prime mover, the generator, the rectifier, a filter capacitor, a contactor, the energy storage device, and the DC bus;

the prime mover runs coaxially with the generator to drive the generator to generate electricity; an electrical terminal of the generator is connected to the rectifier, and the rectifier rectifies alternating current generated by the generator into direct current; an output side of the rectifier is connected to the DC bus, and the filter capacitor is connected in parallel with the DC bus for filtering an output of the rectifier; the energy storage device is connected in parallel with the DC bus via the contactor; and the DC bus is connected in parallel with a load; and wherein the load is a resistive load, and/or an inductive load, and/or a constant power load.

* * * * *